US007153594B2

(12) United States Patent
Kejzelman et al.

(10) Patent No.: US 7,153,594 B2
(45) Date of Patent: Dec. 26, 2006

(54) IRON-BASED POWDER

(75) Inventors: Mikhail Kejzelman, Malmö (SE); Paul Skoglund, Höganäs (SE); Ola Andersson, Nyhamnsläge (SE); Per Knutsson, Ängelholm (SE); Hilmar Vidarsson, Höganäs (SE); Björn Skårman, Lund (SE)

(73) Assignee: Höganäs AB, Höganäs (SE)

( * ) Notice: Subject to any disclaimer, the term of this patent is extended or adjusted under 35 U.S.C. 154(b) by 0 days.

(21) Appl. No.: 10/743,094

(22) Filed: Dec. 23, 2003

(65) Prior Publication Data

US 2004/0191519 A1 Sep. 30, 2004

Related U.S. Application Data

(60) Provisional application No. 60/477,948, filed on Jun. 13, 2003.

(30) Foreign Application Priority Data

Dec. 23, 2002 (SE) .................................... 0203851

(51) Int. Cl.
*B32B 5/16* (2006.01)

(52) U.S. Cl. ......................... 428/694 BP; 428/694 BF; 428/694 BA; 428/403; 427/212

(58) Field of Classification Search .......... 428/694 BP, 428/694 BF, 694 BA, 403; 427/212
See application file for complete search history.

(56) References Cited

U.S. PATENT DOCUMENTS 4,190,441 A * 2/1980 Tengzelius et al. ........... 75/255
4,820,338 A 4/1989 Ochiai et al.
5,754,936 A 5/1998 Jansson
6,375,709 B1 * 4/2002 Storstrom et al. ............ 75/252
6,395,688 B1 * 5/2002 Vidarsson .................... 508/555
6,413,919 B1 * 7/2002 Vidarsson .................... 508/528
6,527,823 B1 * 3/2003 Moro ........................... 75/246
6,537,389 B1 3/2003 Aichele et al.
6,573,225 B1 * 6/2003 Vidarsson et al. .......... 508/555
6,703,106 B1 * 3/2004 Noguchi et al. ............ 428/141
6,713,149 B1 * 3/2004 Harasawa et al. ......... 428/65.3
6,755,885 B1 * 6/2004 Vidarsson et al. ............ 75/252
6,797,373 B1 * 9/2004 Noguchi et al. ............ 428/323
6,855,394 B1 * 2/2005 Noguchi et al. ............ 428/141

FOREIGN PATENT DOCUMENTS

| | | |
|---|---|---|
| EP | 0 205 786 | 12/1986 |
| WO | WO 01/22448 | 3/2001 |
| WO | WO 02/38315 | 5/2002 |
| WO | WO 02/100580 | 12/2002 |

* cited by examiner

*Primary Examiner*—Leszek B. Kiliman
(74) *Attorney, Agent, or Firm*—Buchanan Ingersoll & Rooney PC

(57) ABSTRACT

The present invention concerns a new ferromagnetic powder composition comprising soft magnetic iron-based core particles wherein the surface of the core particles are surrounded by an insulating inorganic coating, and a lubricating amount of a compound selected from the group consisting of silanes, titanates, aluminates, zirconates, or mixtures thereof. The invention also concerns a process for the preparation of soft magnetic composite materials using the new powder composition.

28 Claims, 1 Drawing Sheet

IRON-BASED POWDER

Figure 1:
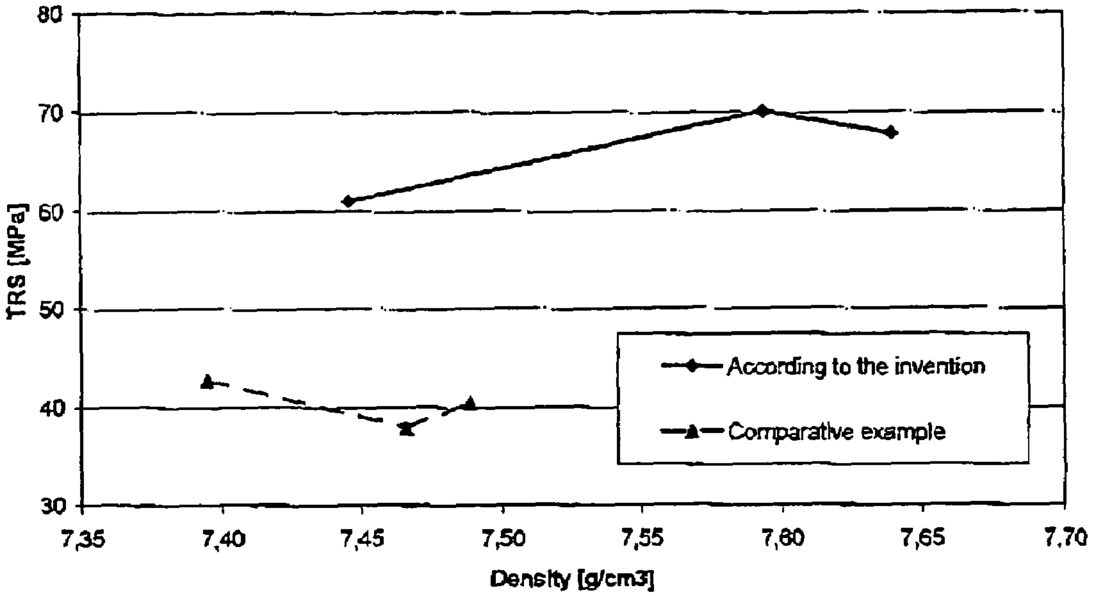

The benefit is claimed under 35 U.S.C. §119(a)–(d) of Swedish Application No. 0203851-1, filed Dec. 23, 2002, and under 35 U.S.C. §119(e) of U.S. Provisional Application No. 60/477,948, filed Jun. 13, 2003.

FIELD OF THE INVENTION

The present invention relates to new metal powder compositions. More specifically, the invention concerns a new iron-based powder which is useful for the preparation of soft magnetic materials having improved properties when used both at high and low frequencies. The invention also concerns a method for the manufacturing of soft magnetic composite materials prepared therefrom.

BACKGROUND OF THE INVENTION

Soft magnetic materials are used for applications, such as core materials in inductors, stators and rotors for electrical machines, actuators, sensors and transformer cores. Traditionally, soft magnetic cores, such as rotors and stators in electric machines, are made of stacked steel laminates. Soft Magnetic Composite, SMC, materials are based on soft magnetic particles, usually iron-based, with an electrically insulating coating on each particle. By compacting the insulated particles optionally together with lubricants and/or binders using the traditionally powder metallurgy process, the SMC parts are obtained. By using this powder metallurgical technique it is possible to produce materials having a higher degree of freedom in the design of the SMC component than by using the steel laminates as the SMC material can carry a three dimensional magnetic flux and as three dimensional shapes can be obtained by the compaction process.

Two key characteristics of an iron core component are its magnetic permeability and core loss characteristics. The magnetic permeability of a material is an indication of its ability to become magnetised or its ability to carry a magnetic flux. Permeability is defined as the ratio of the induced magnetic flux to the magnetising force or field intensity. When a magnetic material is exposed to a varying field, energy losses occur due to both hysteresis losses and eddy current losses. The hysteresis loss is brought about by the necessary expenditure of energy to overcome the retained magnetic forces within the iron core component. The eddy current loss is brought about by the production of electric currents in the iron core component due to the changing flux caused by alternating current (AC) conditions. A high electrical resistivity of the component is desirable in order to minimise the eddy currents.

Research in the powder-metallurgical manufacture of magnetic core components using coated iron-based powders has been directed to the development of iron powder compositions that enhance certain physical and magnetic properties without detrimentally affecting other properties of the final component. Desired component properties include e.g. a high permeability through an extended frequency range, low core losses, high saturation induction, and high strength. Normally an increased density of the component enhances all of these properties provided that a sufficient electrical resistivity can be maintained. The desired powder properties include suitability for compression moulding techniques, which i.e. means that the powder can be easily moulded to a high density component, which can be easily ejected from the moulding equipment without damages on the component surface.

SUMMARY OF INVENTION

The present invention concerns a new ferromagnetic powder composition, which is suitable of compaction to high density composite components. More specifically the present invention concerns a powder composition comprising soft magnetic iron or iron-based core particles, the surface of which are surrounded by an electrically insulating inorganic coating and which composition also includes a lubricating amount of silanes, titanates, aluminates, or zirconates.

The present invention also includes a method of preparing high-density green, and optionally heat-treated, compacts from these compositions. This method comprises the steps of providing the composition, optionally mixing said composition with additives, such as conventional lubricants (i.e. particular lubricants) and binders as well as flow-enhancing agents; uniaxially compacting in a die at high pressure and ejecting the green body, which may subsequently be heat-treated.

DETAILED DESCRIPTION OF THE INVENTION

The ferromagnetic powders used herein are made up of iron or an alloy containing iron optionally in combination with up to 20% by weight of one or more of element selected from the group consisting of aluminium, silicon, chromium, niobium, molybdenum, nickel and cobalt. Preferably the new powder is based on a base powder that consists of essentially pure iron. This powder could be e.g. commercially available water-atomised or gas-atomised iron powders or reduced iron powders, such as sponge iron powders. The powder particle shape could be round, irregular or flat. Preferred electrically insulating coatings, which may be used according to the invention, are thin phosphorus containing coatings of the type described in the U.S. Pat. No. 6348265 which is hereby incorporated by reference. Also other, preferably inorganic coatings may be used, for example coatings based on Cr, Mg, Mo, Zn, Ni, or Co.

The lubricating agent used according to the invention is a type of organo-silanes, organo-titanates, organo-aluminates, or organo-zirconates. This class of substances is often referred to as surface modifying agents, coupling agents, or cross-linking agents depending on the chemical functionality of their linked groups. The specific type of organo-silanes, organo-titanates, organo-aluminates or organo-zirconates which are used according to the present invention and which may be referred to as organo-metallic compounds are distinguished by the presence of at least one hydrolysable group and at least one lubricating organic moiety. This type of compounds can be defined by the following general formula:

$$M(R_1)_n(R_2)_m$$

,wherein M is a central atom selected from Si, Ti, Al, and Zr; $R_1$ is a hydrolysable group; $R_2$ is a group consisting of a lubricating organic moiety; wherein the sum of m+n must equal the coordination number of the central atom and where n is an integer $\geqq 1$ and m is an integer $\geqq 1$.

Particularly $R_1$ is an alkoxy group having less than 12 C atoms. Preferred are those alkoxy groups, which have less than 6, and most preferred are alkoxy groups having 1–3 C atoms. $R_1$ may also be a chelate group, such as a residue of hydroxyacetic acid (—OC(O))—$CH_2O$—) or a residue of ethylene glycol (—$OCH_2CH_2O$—).

$R_2$ is an organic group including between 6–30, preferably 10–24 carbon atoms optionally including one or more hetero atoms selected from the group consisting of N, O, S and P. $R_2$ is a group consisting of an organic moiety, which is not easily hydrolysed and often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic.

A preferred group of lubricating silanes according to the present invention are alkyl-alkoxy silanes and polyether-alkoxy silanes. Furthermore, promising results have been obtained with hexadecyl-trimethoxy silane, isopropyl-triisostearyl titanate, isopropyl-tri(dioctyl)phosphato titanate, neopentyl(diallyl)oxy-tri-(dioctyl)phosphato zirconate, neopentyl(diallyl)oxy-trineodecanoyl zirconate, and diisobutyl-acetoacetyl aluminate.

The amount of the compound is preferably present in amounts above 0.05%, such as in amounts of 0.05–0.5%, preferably 0.07–0.45%, and most preferably 0.08–0.4% by weight of the composition. A too low amount of lubricating agent gives high density but results in poor ejection behaviour and may thus result in poor surface condition of the tool and/or SMC parts. A too high amount, however, may give excellent ejection behaviour but could render in low component densities. Furthermore it is preferred that the compound is present as a lubricating layer on the insulated particles. It should, however, be noted that the geometry of the component as well as the material and quality of the tool, have great impact on the surface condition of the SMC parts after ejection.

The use of compounds organo-silanes, organo-titanates, or organo-aluminates is known from U.S. Pat. Nos. 4,820,338 and 6,537,389. According to the U.S. Pat. No. 4,820,338 silanes, titanates or aluminates are used in order to accelerate a coupling between the magnetic powder particles and an electrically insulating organic binder polymer. The powder particles do not have an inorganic coating.

The U.S. Pat. No. 6,537,389 discloses a wide range of silicon-, aluminium-, or boron-containing compounds as molecular precursors for producing electrically insulating ceramics on soft magnetic powders. The precursor compounds are converted by thermal treatments into ceramic, metallic or intermetallic end products to enhance temperature and solvent resistance. The U.S. Pat. No. 6,537,389 distinguishes from the present invention i.a. in that the organo-metallic compounds are used as precursors for producing chemically and thermally resistant coatings, and not as the key component that facilitates production of high density parts. Furthermore, the precursor compounds described in the examples of U.S. Pat. No. 6,537,389 do not include a lubricating moiety.

The lubricating compound(s) used according to the present invention can be used in such a way that it is dissolved or dispersed in a suitable solvent, e.g. an organic solvent, such as acetone or ethanol. The obtained solution or dispersion is subsequently added to the iron based powder during mixing and optionally heating. The solvent is finally evaporated optionally in vacuum.

According to one embodiment of the invention the powder used has coarse particles i.e. the powder is essentially without fine particles. The term "essentially without fine particles" is intended to mean that less than about 5% of the iron or iron-based powder particles have size below 45 μm as measured by the method described in SS-EN 24 497. So far the most interesting results have been achieved with powders essentially consisting of particles above about 106 μm and particularly above about 212 μm. The term "essentially consisting" is intended to mean that at least 40%, preferably at least 60% of the particles have a particle size above 106 and 212 μm, respectively. So far the best results have been obtained with powders having an average particle size about 250 μm and only less than 3% below 106 μm. The maximum particle size may be about 5 mm. The particle size distribution for iron-based powders used at PM manufacturing is normally distributed with a Gaussian distribution with an average particle diameter in the region of 30 to 100 μm and about 10–30% less than 45 μm. Iron based powders essentially free from fine particles may be obtained by removing the finer fractions of the powder or by manufacturing a powder having the desired particle size distribution.

According to a preferred embodiment of the invention and contrary to common practice in powder metallurgy, where conventional PM lubricants are used in the iron powder mix, or where a lubricant is used in combination with binder and/or surface treatments the iron or iron-based powder must not be mixed with a separate (particular) lubricant before it is transferred to the die. Nor is it necessary to use external lubrication (die wall lubrication) where the walls of the die are provided with a lubricant before the compaction is performed. The invention, however, does not exclude the possibility of, when it is of interest, to utilise conventional internal lubrication (in an amount up to 0.5% by weight), external lubrication or a combination of both. The powder to be compacted may also include additives selected from the group consisting of binders, lubricants, and flow-enhancing agents. Examples of inorganic lubricants, which may be used in addition to organic PM lubricants, are hexagonal boron nitride, and $MoS_2$.

According to the present invention soft magnetic composite materials having a density of at least 7.45 g/cm$^3$ can be prepared by uniaxially compacting the new powder compositions in a die at high compaction pressures and without die wall lubrication. When the green body has been ejected from the compaction tool it can be heat treated up to temperatures of about 700° C.

The term "at high compaction pressure" is intended to mean at pressures of about at least 800 MPa. More interesting results are obtained with higher pressures such as pressures above 900, more preferably above 1000, and most preferably above 1100 MPa. Conventional compaction at high pressures, i.e. pressures above about 800 MPa, with conventionally used powders including finer particles are generally considered unsuitable due to the high forces required in order to eject the compacts from the die, the accompanying high wear of the die, and the fact that the surfaces of the components tend to be less shiny or deteriorated. High electrical resistance can be obtained even though high compaction pressures are used to achieve the high density. By using the powders according to the present invention it has unexpectedly been found that the ejection force is reduced at high pressures of about 1000 MPa, and that components having acceptable or even perfect surfaces may be obtained.

The compaction may be performed with standard equipment, which means that the new method may be performed without expensive investments. The compaction is performed uniaxially and preferably in a single step at ambient or elevated temperature. Alternatively, the compaction may be performed with the aid of a percussion machine (Model HYP 35-4 from Hydropulsor) as described in patent publication WO 02/38315.

The heat treatment may be performed at the temperatures normally used, e.g. up to temperatures of about 700° C. in different types of atmospheres or at reduced pressure and optionally in the presence of steam. Prior to the heat treatment the pressed components may optionally be green machined and/or cleaned.

A main object of the present invention is to achieve high density products and to this end it is preferred to use coarse powders as described above. It has, however, also been found that these lubricating effects can also be obtained in combination with powders including higher amounts of fine particles i.e. the type of powders which are conventionally used in the PM industry today. Example 3 and 5 below illustrates the lubricating effect of the organo-metallic compounds according to the present invention on both conventional powders and coarse powders. As can be observed high densities are obtained also with a conventional powder including higher amounts of fine particles. Compositions including iron or iron-based powders with the particle size distributions which are normally used today and the lubricating agents according to the present invention may be of special interest for certain applications and are therefore also within the scope of the invention.

The term “high density” is intended to mean compacts having a density of about at least 7.45 g/cm$^3$. “High density” is not an absolute value. A typical achievable density according to the state of the art for single heat-treated, single pressed components is about 7.2 g/cm$^3$. By using warm compaction an increase of about 0.2 g/cm$^3$ may be reached. In this context the term “high density” is intended to mean compacts having a density of about 7.45–7.65 g/cm$^3$ and above, depending on type and amount of additives used, and type of iron-based powder used. Components having lower densities can of course also be produced but are believed to be of less interest.

In brief the advantage obtained by using the powder and method according to the present invention is that high-density SMC parts can be cost-efficiently produced. SMC parts with remarkably high magnetic induction levels together with low core losses can be obtained. Other advantages are that the mechanical strength after heat treatment is increased and that, in spite of very high densities, compacted parts with high electrical resistance can be successfully ejected from the dies without negatively influence the finish of the die walls and/or on the surfaces of the compacted SMC parts. It is thus possible to obtain parts having excellent surface finish. These results can be obtained with a single compaction step. Examples of products of special interest for the new powder compacts are inductors, stators and rotors for electrical machines, actuators, sensors and transformer cores. The invention is further illustrated by the following examples. It is understood that the present invention is not limited thereto.

EXAMPLE 1

An iron-based water atomised powder (Somaloy 550™, available from Höganäs AB, Sweden) was used as starting material. This powder has an average particle size between 212 and 425 μm and less than 5% of the particles have a particle size below 45 μm. This powder, which is a pure iron powder, the particles of which are electrically insulated by a thin phosphorus containing barrier, was treated with 0.2% by weight of a hexadecyl-trimethoxy silane as a lubricating agent. The addition of the lubricating agent was performed as follows: hexadecyl-trimethoxy silane was diluted in ethanol to a 20% solution by weight and the solution was stirred during 60 minutes. An amount of this solution corresponding to 0.2% by weight was added during mixing to the iron powder, which had previously been heated to 75° C. in the mixer. An intensive mixing was carried out in the same mixer during 3 minutes followed by mixing at a lower speed during 30 minutes and during vacuum in order to evaporate the solvent. A corresponding powder mixed with a conventional lubricant was used as comparison. This powder was mixed with Kenuolube™ before the compaction. The amount of the lubricant used was 0.5% of the composition, which is generally considered as a low amount of lubricant for components compacted at high pressures.

Rings with an inner diameter of 47 mm and an outer diameter of 55 mm and a height of 4 mm were uniaxially compacted in a single step at different compaction pressures 800, 1000 and 1200 MPa, respectively. Despite the low amount of the organo-metallic lubricating agent and high compaction pressures the surfaces of the components showed no sign of deterioration.

After compaction the parts were heat treated at 500° C. for 30 minutes in air. The obtained heat-treated rings were wound with 25 sense and 112 drive turns. The magnetic properties were measured in an LDJ 3500 Hysteresigraph. Table 1 summarizes the maximum relative permeability and the magnetic induction at 1500 and 6900 A/m respectively, measured under DC conditions. The core loss/cycle has also been measured at 1 T and at 50 Hz and at 400 Hz, respectively.

The following table 1 demonstrates the obtained results:

TABLE 1

| Sample | Compaction Pressure MPa | Density g/cm$^3$ | $\mu_{max}$ | $B_{1500}$ (T) | $B_{6900}$ (T) | Core loss/cycle at 1T and 50 Hz (J/kg) | Core loss/cycle at 1T and 400 Hz (J/kg) |
|---|---|---|---|---|---|---|---|
| According to the invention | 800 | 7.45 | 720 | 1.08 | 1.53 | 0.134 | 0.178 |
| | 1000 | 7.59 | 790 | 1.15 | 1.59 | 0.126 | 0.163 |
| | 1200 | 7.64 | 820 | 1.18 | 1.62 | 0.124 | 0.165 |
| Comparative example | 800 | 7.39 | 620 | 0.95 | 1.46 | 0.142 | 0.200 |
| | 1000 | 7.47 | 590 | 0.95 | 1.49 | 0.140 | 0.198 |
| | 1200 | 7.49 | 550 | 0.92 | 1.48 | 0.140 | 0.193 |

As can be seen from table 1 the green density is significantly higher for the powder according to the invention and magnetic properties are, hence improved compared with the materials used in the comparative examples. The comparative example also demonstrates that no or only minor improvements of the magnetic properties can be obtained by increasing the compaction pressure to 1000 MPa and 1200 MPa.

Despite the obtained high density of the samples the core losses are maintained at a low level even at 400 Hz, which shows that the electrical insulating layers are maintained.

Samples produced according to Example 1 were tested with regard to transverse rupture strength (TRS) after heat treatment at 500° C. for 30 minutes in air. The transverse rupture strength was tested according to ISO 3995. FIG. 1 demonstrates the transverse rupture strength at different density levels. It should be noted that, even at the same pressed density, the strength is unexpectedly higher for the material according to the invention.

EXAMPLE 2

A very high purity water atomised iron-based powder, the particles of which were provided with a thin insulating coating and which had a mean particle size above 212 μm was treated with 0.1% and 0.2% of hexadecyl-trimethoxysilane, respectively, according to the procedure in Example 1. The same iron-based powder without any lubricating agent was used as a reference.

Cylindrical samples with a diameter of 25 mm and a height of 4 mm were compacted in an uniaxially press movement at a compaction pressure of 1000 MPa.

Table 2 shows the ejection energy needed for ejecting the components and the green density obtained. The ejection energy is expressed as percentage of the ejection energy for the sample without lubricating agent.

TABLE 2

| Amount of silane | Green density ($g/cm^3$) | Relative Ejection Energy % | Surface finish |
|---|---|---|---|
| 0% | 7.66 | 100 | Seizure |
| 0.1% | 7.67 | 58 | Good |
| 0.2% | 7.66 | 48 | Good |

From table 2 it can be seen that the energy needed for ejection is considerably reduced and the surface finish is improved by minor additions of an organo-metallic lubricating agent according to the present invention. It can also be observed that an increase from 0.1% to 0.2% by weight of a lubricating agent has a positive impact on the ejection energy.

EXAMPLE 3

This example demonstrates the effect of the chain length of the unhydrolysed group or groups ($R_2$) of the organo-metallic compound on the lubricating properties at ejection-after compaction with high pressures. In this example various types and amounts of alkyl-alkoxy silanes (central atom Si) are used as lubricating agent. Two kinds of high purity water atomised iron-based powder provided with a thin insulating coating with two different particle size distributions were used to show the influence of the particle size. The S-powder has about 14% of the particles less than 45 μm and a weight average particle size of about 100 μm. The C-powder has a significantly coarser particle size distribution with a weight average size of about 250 μm and less than 3% below 106 μm.

Five different kinds of organo-silanes were used (A–E):

A Methyl-trimethoxy silane

B Propyl-trimethoxy silane

C Octyl-trimethoxy silane

D Hexadecyl-trimethoxy silane

E Polyethyleneether-trimethoxy silane with 10 ethylene ether groups

Five different alkyl-alkoxy silanes in the range 0.05 to 3.0% by weight were added to the insulated iron-based powder and the obtained mixtures were compacted at 1100 MPa in a uniaxial press movement into slugs with a diameter of 25 mm and a height of 12 mm. During ejection the dynamic ejection force per unit sliding area was measured and after ejection green surface finish was evaluated and density was measured as is shown below in table 3.

TABLE 3

| | Powder C | Powder C | Powder C | Powder S | Powder C | Powder S | Powder C | Powder C |
|---|---|---|---|---|---|---|---|---|
| Silane | 0.05% | 0.1% | 0.2% | 0.2% | 0.4% | 0.4% | 1.0% | 3.0% |
| A | | | | | | | | Seizure |
| B | | | | | | | Seizure | |
| C | | | Seizure | | 58 $N/mm^2$<br>Poor<br>7.60 $g/cm^3$ | | | |
| D | 89 $N/mm^2$<br>Poor<br>7.70 $g/cm^3$ | 69 $N/mm^2$<br>OK<br>7.70 $g/cm^3$ | 38 $N/mm^2$<br>OK<br>7.68 $g/cm^3$ | 63 $N/mm^2$<br>Poor<br>7.65 $g/cm^3$ | 47 $N/mm^2$<br>OK<br>7.57 $g/cm^3$ | 54 $N/mm^2$<br>OK<br>7.54 $g/cm^3$ | | |
| E | | 80 $N/mm^2$<br>Poor<br>7.70 $g/cm^3$ | 35 $N/mm^2$<br>OK<br>7.69 $g/cm^3$ | 75 $N/mm^2$<br>Poor<br>7.64 $g/cm^3$ | 32 $N/mm^2$<br>OK<br>7.59 $g/cm^3$ | 49 $N/mm^2$<br>OK<br>7.60 $g/cm^3$ | | |

As can be seen from table 3 a chain length below 8 carbon atoms in the alkyl chain does not give satisfactory results, even though the added amount is high. Hence, at least 8 atoms in the lubricating (alkyl, or polyethyleneether,) chain group or groups are needed in order to successfully eject the component. An added amount above 0.5% is believed to be of less interest, as the density of the green component will be negatively influenced. The table also shows, that when the organo-silane content is less than 0.05%, ejection without damaging the component and the surface of the die is not possible for the silane "D" that contains 16 atoms in the lubricating alkyl group. However, the geometry of the component as well as the quality of the tool have a great impact on the surface condition of the component after ejection. Therefore, lower amounts than 0.05% lubricant agent, optionally mixed with conventionally used i.e. particular lubricants, can be of interest for some applications.

From table 3 it can also be concluded that extremely high densities can be obtained. The coarse powder shows superior ejection behaviour compared to the standard powder. Even powder with a standard particle size distribution can be compacted to high density (about at least 7.60 g/$cm^3$). As is noted above, the ejection behaviour is also here greatly dependent on component geometry and tool material and quality. Thus, powders with a standard size distribution can be of interest in some applications.

EXAMPLE 4

This example demonstrates the lubrication effect of organo-metallic compounds with different central atoms. In this example the lubrication effect of four different agents have been examined i.e. silane, titanate, zirconate and aluminate, having Si, Ti, Zr and Al as the central atom, respectively. The various central atoms have different coordination numbers and chemical properties. However, the chemical structure of the organo-metallic compound was selected so that the chain length of the lubricating group or groups ($R_2$) would show comparable properties which can be compared with those obtained with hexadecyl-trimethoxy silane (D).

A high purity water atomised iron-based powder with a thin insulating coating were treated with 0.2% by weight of each organo-metallic compound as lubricating agent. The obtained mixtures were compacted at 1100 MPa in a uniaxial press movement into slugs with a diameter of 25 mm and a height of 12 mm. During ejection the dynamic ejection force per unit sliding area was measured and after ejection green surface finish was evaluated and density was measured as is shown below in table 4.

Four different types of organo-metallic agents were examined (A–D);

A Isopropyl-triisostearoyl titanate

B Neopentyl(diallyl)oxy-trineodecanonyl zirconate

C Diisobutyl(oleyl)aceto-acetyl aluminate

D Hexadecyl-trimethoxy silane

TABLE 4

| | Organo-metallic compound | | | |
|---|---|---|---|---|
| | A | B | C | D |
| Ejection force [N/$mm^2$] | 35 | 44 | 50 | 39 |
| Denisty [g/$cm^3$] | 7.68 | 7.68 | 7.68 | 7.68 |
| Ejection and part quality | OK | OK | OK | OK |

As can be seen from table 4 the lubricating properties of all compounds are satisfactory. Hence, the type of central atom shows only minor influence on the lubricating properties. The chain length, and to some extent the chemical structure, of the unhydrolysed group or groups are shown to provide the lubricating properties according to the present invention.

EXAMPLE 5

The influence of average particle size and particle size distribution was further investigated. Three different high purity iron-based powders with different particle size distributions, according to table 5, all of them insulated with a thin phosphate-based electrical insulation were prepared. All samples were treated according to the present invention with 0.2 wt % of hexadecyl-trimethoxy silane according to the procedure described in Example 1.

Cylindrical samples with a diameter of 25 mm and a weight of 50 grams were compacted in an uniaxially press movement at a compaction pressure of 1000 MPa and green densities above 7.6 g/$cm^3$for all the samples were obtained.

TABLE 5

| Particle size distribution | Sample A (%) | Sample B (%) | Sample C (%) |
|---|---|---|---|
| −45 μm | 8.4 | 0.0 | 0.1 |
| 45–106 μm | 52.7 | 15.5 | 1.0 |
| 106–212 μm | 30.0 | 84.3 | 37.4 |
| 212–315 μm | 0.1 | 0.2 | 51.0 |
| +315 μm | 0.1 | 0.0 | 10.5 |
| Density [g/$cm^3$] | 7.61 | 7.63 | 7.62 |
| Surface finish | Poor* | OK | Good |

*Higher amount of lubricant agent improves surface finish.

It could be observed that the surface finish of the sample C was superior to those of the samples A and B, respectively.

EXAMPLE 6

This example illustrates the importance of the inorganic insulation.

A high purity iron powder, the particles of which are electrically insulated by a thin phosphorus-containing barrier was compared with an identical powder without the phosphorus-based inorganic insulation. Both types of powders were subsequently treated with 0.2% by weight of hexadecyl-trimethoxy silane as a lubricating agent according to the invention.

Rings with an inner diameter of 45 mm and an outer diameter of 55 mm and a height of 5 mm were uniaxially compacted in a single step at compaction pressure 1100 MPa. After compaction the parts were heat treated at 500° C. for 30 minutes in air. The electrical resistivity was measured by the four-point method.

The following table 6 shows electrical resistivity and density of composite components prepared of powders with and without insulated particles.

TABLE 6

| | Electrical Resistivity [μOhm * m] | Density [g/$cm^3$] |
|---|---|---|
| According to the invention | 150 | 7.68 |
| Comparative example | 0.5 | 7.68 |

The invention claimed is:

1. A ferromagnetic powder composition for die compaction to produce high density soft magnetic composite parts comprising soft magnetic iron-based core particles wherein at least 40% of said iron-based core particles consist of particles having a particle size above about 106 μm and less than 5% of said iron-based ore particles having a particle size below 45 μm and wherein the surfaces of the core particles are surrounded by an insulating inorganic coating, and a lubricating amount of a compound selected from the group consisting of silanes, titanates, aluminates, zirconates, or mixtures thereof, having the following general formula:

$$M(R_1)_n(R_2)_m,$$

wherein M is a central atom selected from Si, Ti, Al, or Zr, $R_1$, is a hydrolysable group, $R_2$ is a group consisting of a lubricating organic moiety, wherein the sum of m+n is the coordination number of the central atom;

n is an integer ≧1and m is an integer ≧1.

2. A composition according to claim 1 wherein the compound is present as a lubricating layer on the insulated particles.

3. A composition according to claim 1, wherein $R_1$ is an alkoxy group having less than 12 carbon atoms.

4. A composition according to claim 1, wherein $R_1$ is a chelate group.

5. A composition according to claim 4, wherein the chelate group is a residue of hydroxyacetic acid (—O(O═C)—$CH_2O$—) or a residue of ethylene glycol (—$OCH_2CH_2O$—).

6. A composition according to claim 1, wherein $R_2$ is an organic group including between 6–30 carbon atoms, and optionally including one or more helen atoms selected from the group consisting of N, O, S and P.

7. A composition according to claim 6, wherein the $R_2$ group is linear, branched, cyclic, or aromatic.

8. A composition according to claim 6, wherein the $R_2$ group is a chain selected from the group consisting of alkyl, ether, ester, phospho-alkyl, phospho-lipid, or phospho-amine.

9. A composition according to claim 8, wherein the $R_2$ is selected from the group consisting of phosphato, pyrophosphato or phosphito.

10. A composition according to claim 1, wherein the compound is selected from the group consisting of alkyl-alkoxy silanes and polyather-alkoxy silanes.

11. A composition according to claim 1, wherein the compound is selected from the group consisting of octyl-trimethoxy silane, hexadecyl-trimethoxy silane, polyethyleneether-trimethoxy silane, isopropyl-triisostearyl titanate, isopropyl-tri(dioctyl)phosphato titanate, neopentyl(diallyl)oxy-trineodecanoyl zirconate, neopentyl(dllallyl)oxy-tri(dioctyt)phosphato zirconate, and diisobutylscetoacetyl aluminate.

12. A composition according to claim 1, wherein the insulating inorganic coating of the iron-based particles is phosphorous based.

13. A composition according to claim 1, wherein the iron-based core particles consist of essentially pure iron.

14. A powder composition according to claim 1, wherein at least 20% of the iron-based core particles consist of particles having a particle size above about 212 μm.

15. A composition comprising a compound according to claim 1, wherein the amount of the compound is present in an amount of 0.05–0.5% by weight.

16. A composition according to claim 1, which is mixed with additives, such as particular lubricants, binders or flow-enhancing agents.

17. Process for the preparation of soft magnetic composite materials having a density of at least 7.45 $g/cm_3$ comprising the steps of providing an iron or iron-based powder composition comprising soft magnetic iron-based core particles wherein at least 40% of said iron-based core particles consist of particles having a particle size above about 106 μm and less than 50% of said iron-based core articles have a particle size below 45 μm and wherein the surfaces of the core particles are surrounded by en insulating inorganic coating, and a lubricating amount of a compound selected from the group consisting of silanes, titanates, aluminates, zirconates, or mixtures thereof;

uniaxially compacting the obtained soft magnetic powder composition in a die at a compaction pressure of at least about 800 MPa; and ejecting the green body from the compaction tool; and optionally heat-treating the compacted body.

18. Process according to claim 17, wherein the compaction is performed at a pressure of at least about 900 MPa.

19. A process according to claim 17, wherein the compound has the following general formula:

$$M(R_1)_n(R_2)_m,$$

wherein M is a central atom selected from Si, Ti, Al, or Zr, $R_1$ is a hydrolysable group, $R_2$ is a group consisting of a lubricating organic moiety, wherein the sum of m+n is the coordination number of the central atom;

n is an integer ≧1 and m is an integer ≧1.

20. A process according to claim 19, wherein $R_2$ is an organic group including between 10–25 carbon atoms and optionally including one or more hetero atoms selected from the group consisting of N, O, S and P.

21. A composition according to claim 7, wherein the $R_2$ group is a chain selected from the group consisting of alkyt, ether, ester, phospho-alkyl, phospho-lipid, or phospho-amine.

22. A composition according to claim 1 wherein at least 60% of the iron-based ore particles consist of particles having a particle size of about 106 μm.

23. A composition according to claim 1 wherein at least 40% of the iron-based particles consist of particles having a particle size above about 212 μm.

24. A composition according to claim 1 wherein at least 60% of the iron-based particles consist of particles having a particle size above about 212 μm.

25. A composition comprising a compound according to claim 1, wherein the amount of the compound is present in an amount of 0.07–0.45% by weight.

26. A composition comprising a compound according to claim 1, wherein the amount of the compound is present in an amount of 0.08–0.4% by weight.

27. A process according to claim 17, wherein the compaction is performed at a pressure of at least about 1000 MPa.

28. A process according to claim 17, wherein the compaction is performed at a pressure of at least about 1100 MPa.

* * * * *

UNITED STATES PATENT AND TRADEMARK OFFICE

CERTIFICATE OF CORRECTION

PATENT NO. : 7,153,594 B2 
APPLICATION NO. : 10/743094
DATED : December 26, 2006
INVENTOR(S) : Kejzelman et al.

It is certified that error appears in the above-identified patent and that said Letters Patent is hereby corrected as shown below:

In Claim 17 at column 12, line 3, delete "50%", and insert --5%--.

Signed and Sealed this

Sixteenth Day of February, 2010

David J. Kappos
*Director of the United States Patent and Trademark Office*